United States Patent
Chen et al.

(10) Patent No.: US 11,985,132 B2
(45) Date of Patent: May 14, 2024

(54) SYSTEM AND METHOD FOR RESOURCE ACCESS AUTHENTICATION

(71) Applicant: Samsung Electronics Co., Ltd., Suwon-si (KR)

(72) Inventors: Haining Chen, Santa Clara, CA (US); Xun Chen, Fremont, CA (US); Khaled ElWazeer, Santa Clara, CA (US); Ahmed M. Azab, Palo Alto, CA (US); David Thomson, San Jose, CA (US); Ruowen Wang, San Jose, CA (US); Wei Yang, Sunnyvale, CA (US); Peng Ning, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 16/399,865

(22) Filed: Apr. 30, 2019

(65) Prior Publication Data
US 2019/0342298 A1 Nov. 7, 2019

Related U.S. Application Data

(60) Provisional application No. 62/666,055, filed on May 2, 2018.

(51) Int. Cl.
*H04L 29/06* (2006.01)
*H04L 9/40* (2022.01)

(52) U.S. Cl.
CPC ............ *H04L 63/102* (2013.01); *H04L 63/08* (2013.01)

(58) Field of Classification Search
CPC .............................. H04L 63/102; H04L 63/08
See application file for complete search history.

(56) References Cited

U.S. PATENT DOCUMENTS 8,364,971 B2    1/2013   Bell et al.
9,378,342 B2    6/2016   Robison et al.
(Continued)

FOREIGN PATENT DOCUMENTS

EP          3009950 A1     4/2016
WO       2014/142947 A1    9/2014
(Continued)

OTHER PUBLICATIONS

Omaimah Omar Bamasag et al., Towards Continuous Authentication in Internet of Things Based on Secret Sharing Scheme, Oct. 4, 2015, ACM, pp. 1-8. (Year: 2015).*

(Continued)

*Primary Examiner* — Luu T Pham
*Assistant Examiner* — Fahimeh Mohammadi

(57) ABSTRACT

A method of providing continuous user authentication for resource access control includes launching a continuous authentication service at a boot time of a first device, wherein the first device includes a processor, a memory, and one or more sensors configured to collect authentication information. Additionally, the method includes receiving authentication information comprising one or more of explicit authentication information or implicit authentication information, and receiving a request for access to a resource of the first device. Further, the method includes the operations of determining, by the continuous authentication service, a current value of a security state, the current value of the security state based in part on a time interval between a receipt time of the authentication information and a current time and controlling access to the resource based on the current value of the security state.

20 Claims, 10 Drawing Sheets

(56) References Cited

U.S. PATENT DOCUMENTS

| | | | |
|---|---|---|---|
| 9,743,279 B2 | 8/2017 | Rachuri et al. | |
| 9,912,657 B2 | 3/2018 | Dasgupta et al. | |
| 10,102,362 B2 | 10/2018 | Singh et al. | |
| 10,122,764 B1 | 11/2018 | Obaidi | |
| 10,140,441 B2 | 11/2018 | Cheng et al. | |
| 10,142,332 B2 | 11/2018 | Ravindran et al. | |
| 2002/0095586 A1 | 7/2002 | Doyle et al. | |
| 2003/0112182 A1* | 6/2003 | Bajikar | G06F 21/30 342/457 |
| 2006/0155988 A1* | 7/2006 | Hunter | G06F 21/575 713/164 |
| 2006/0174319 A1* | 8/2006 | Kraemer | G06F 21/57 726/1 |
| 2009/0006859 A1* | 1/2009 | Zimmer | G06F 21/575 713/186 |
| 2009/0254753 A1* | 10/2009 | De Atley | G06F 21/51 713/176 |
| 2010/0100964 A1* | 4/2010 | Mahaffey | G06F 21/577 726/25 |
| 2010/0175116 A1* | 7/2010 | Gum | H04L 63/107 726/6 |
| 2012/0159172 A1* | 6/2012 | Saxena | H04L 63/107 713/176 |
| 2013/0051632 A1* | 2/2013 | Tsai | G06V 40/70 382/118 |
| 2014/0283059 A1* | 9/2014 | Sambamurthy | G06F 21/552 726/23 |
| 2014/0289820 A1 | 9/2014 | Lindemann et al. | |
| 2014/0289821 A1 | 9/2014 | Wilson | |
| 2014/0365755 A1* | 12/2014 | Liu | G06F 21/572 713/2 |
| 2014/0366111 A1* | 12/2014 | Sheller | G06F 21/31 726/7 |
| 2015/0242605 A1* | 8/2015 | Du | G06F 21/32 726/7 |
| 2015/0310444 A1 | 10/2015 | Chen et al. | |
| 2016/0127351 A1* | 5/2016 | Smith | G06F 21/316 726/10 |
| 2016/0180094 A1* | 6/2016 | Dasar | G06F 9/4406 714/36 |
| 2016/0188862 A1 | 6/2016 | Singh et al. | |
| 2017/0180363 A1 | 6/2017 | Smith et al. | |
| 2017/0193211 A1 | 7/2017 | Blake et al. | |
| 2017/0289130 A1* | 10/2017 | Park | H04L 63/0861 |
| 2017/0372055 A1* | 12/2017 | Robinson | H04W 12/64 |
| 2018/0149755 A1* | 5/2018 | Mendis | G01S 19/05 |

FOREIGN PATENT DOCUMENTS

| | | |
|---|---|---|
| WO | 2015/127256 A1 | 8/2015 |
| WO | 2016003024 A1 | 1/2016 |

OTHER PUBLICATIONS

Pages 135-146Stavros Papadopoulos et al., CADS: Continuous Authentication on Data Streams, Sep. 23, 2007, ACM, pp. 135-146. (Year: 2007).*

Vishal M. Patel et al., Continuous User Authentication on Mobile Devices, Jul. 1, 2016, IEEE, vol. 33, Issue: 4, pp. 49-61. (Year: 2016).*

Mario Frank et al., Touchalytics: On the Applicability of Touchscreen Input as a Behavioral Biometric for Continuous Authentication, Jan. 2013, IEEE, vol. 8, Issue: 1, pp. 136-148. (Year: 2013).*

Notification of Transmittal of the International Search Report and the Written Opinion of the International Searching Authority, or the Declaration dated Aug. 7, 2019 in connection with International Patent Application No. PCT/KR2019/005280, 11 pages.

Supplementary European Search Report dated Feb. 3, 2021 in connection with European Patent Application No. 19 79 7140, 8 pages.

Intention to Grant dated May 19, 2023 in connection with European Patent Application No. 19797140.1, 53 pages.

Office Action dated Oct. 11, 2023 in connection with Chinese Patent Application No. 201980027029.X, 19 pages.

Notice of Allowance dated Aug. 24, 2023 in connection with European Patent Application No. 19797140.1, 52 pages.

* cited by examiner

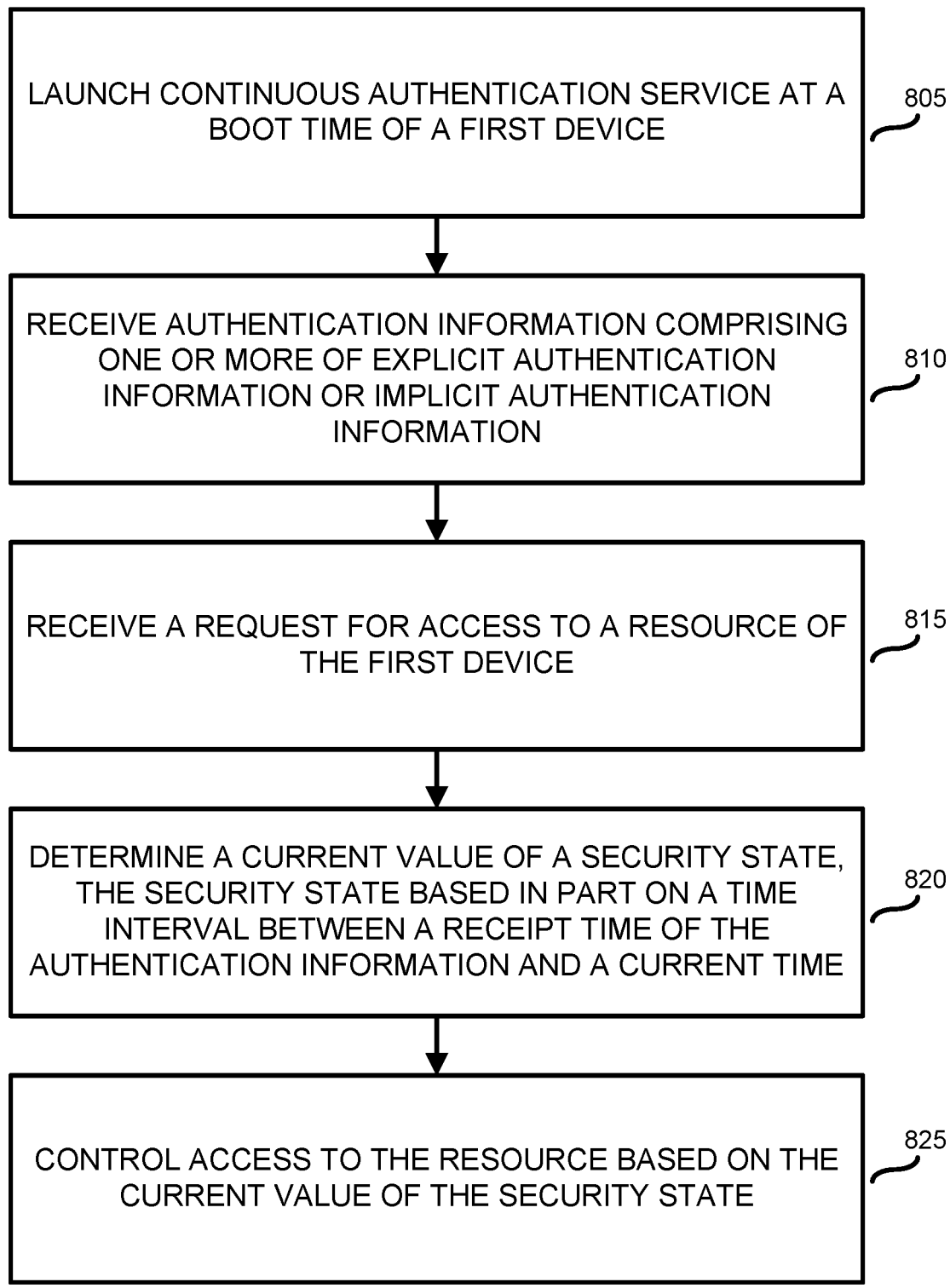

SYSTEM AND METHOD FOR RESOURCE ACCESS AUTHENTICATION

CROSS-REFERENCE TO RELATED APPLICATION AND CLAIM OF PRIORITY

This application claims priority under 35 U.S.C. § 119(e) to U.S. Provisional Patent Application No. 62/666,055 filed on May 2, 2018. The above-identified provisional patent application is hereby incorporated by reference in its entirety.

TECHNICAL FIELD

This disclosure relates generally to electronic security. More specifically, this disclosure relates to systems and methods for resource access authentication.

BACKGROUND

Given their portability and the wide range of data and types of applications supported by certain electronic devices (for example, smartphones and tablets), ensuring that such devices are accessed only by authenticated users is a pressing and real concern. As one illustrative example, the convenience of being able to access one's bank accounts through a smartphone is rendered meaningless if any user of the smartphone can access the bank accounts.

At the same time, given the frequency with which many users interact with certain devices, such as smartphones, providing a smooth and generally seamless user experience, without unnecessary locking of the device and prompts for passwords or fingerprint scans is likewise a real and pressing concern.

Thus, simultaneously providing an effective authentication functionality for the wide range of applications supported by certain electronic devices, while at the same time, providing a smooth and uninterrupted user experience remains a source of technical challenges and opportunities for improvement in the performance of certain electronic devices, such as smartphones and tablets.

SUMMARY

This disclosure provides a system and method for resource access control authentication.

In a first embodiment, a method of providing continuous user authentication for resource access control includes launching a continuous authentication service at a boot time of a first device, wherein the first device includes a processor, a memory, and one or more sensors configured to collect authentication information. Additionally, the method includes receiving authentication information comprising one or more of explicit authentication information or implicit authentication information, and receiving a request for access to a resource of the first device. Further, the method includes the operations of determining, by the continuous authentication service, a current value of a security state, the current value of the security state based in part on a time interval between a receipt time of the authentication information and a current time, and controlling access to the resource based on the current value of the security state.

In a second embodiment, a first electronic device providing continuous user authentication for resource access control includes a processor, one or more sensors configured to collect authentication information, and a memory. Further, the memory includes instructions, which when executed by the processor, cause the first electronic device to launch a continuous authentication service at a boot time of the first electronic device, and receive authentication information comprising one or more of explicit authentication information or implicit authentication information. Additionally, the instructions, when executed by the processor, cause the first electronic device to receive, a request for access to a resource of the first electronic device, determine, by the continuous authentication service, a current value of a security state, the current value of the security state based in part on a time interval between a receipt time of the authentication information and a current time, and control access to the resource based on the current value of the security state.

In a third embodiment, a non-transitory computer-readable medium includes instructions, which when executed by a processor, cause a first device to launch a continuous authentication service at a boot time of the first device, the first device including the processor, a memory, and one or more sensors configured to collect authentication information. Additionally, the non-transitory computer-readable medium includes instructions, which when executed by the processor, cause the first device to receive authentication information comprising one or more of explicit authentication information or implicit authentication information and receive, a request for access to a resource of the first device. The instructions, when executed by the processor, further cause the device to determine, by the continuous authentication service, a current value of a security state, the current value of the security state based in part on a time interval between a receipt time of the authentication information and a current time, and control access to the resource based on the current value of the security state.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 8 illustrates operations of a method for implementing resource access control authentication according to embodiments of this disclosure.

DETAILED DESCRIPTION

FIGS. 1 through 9B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

Figure 1:
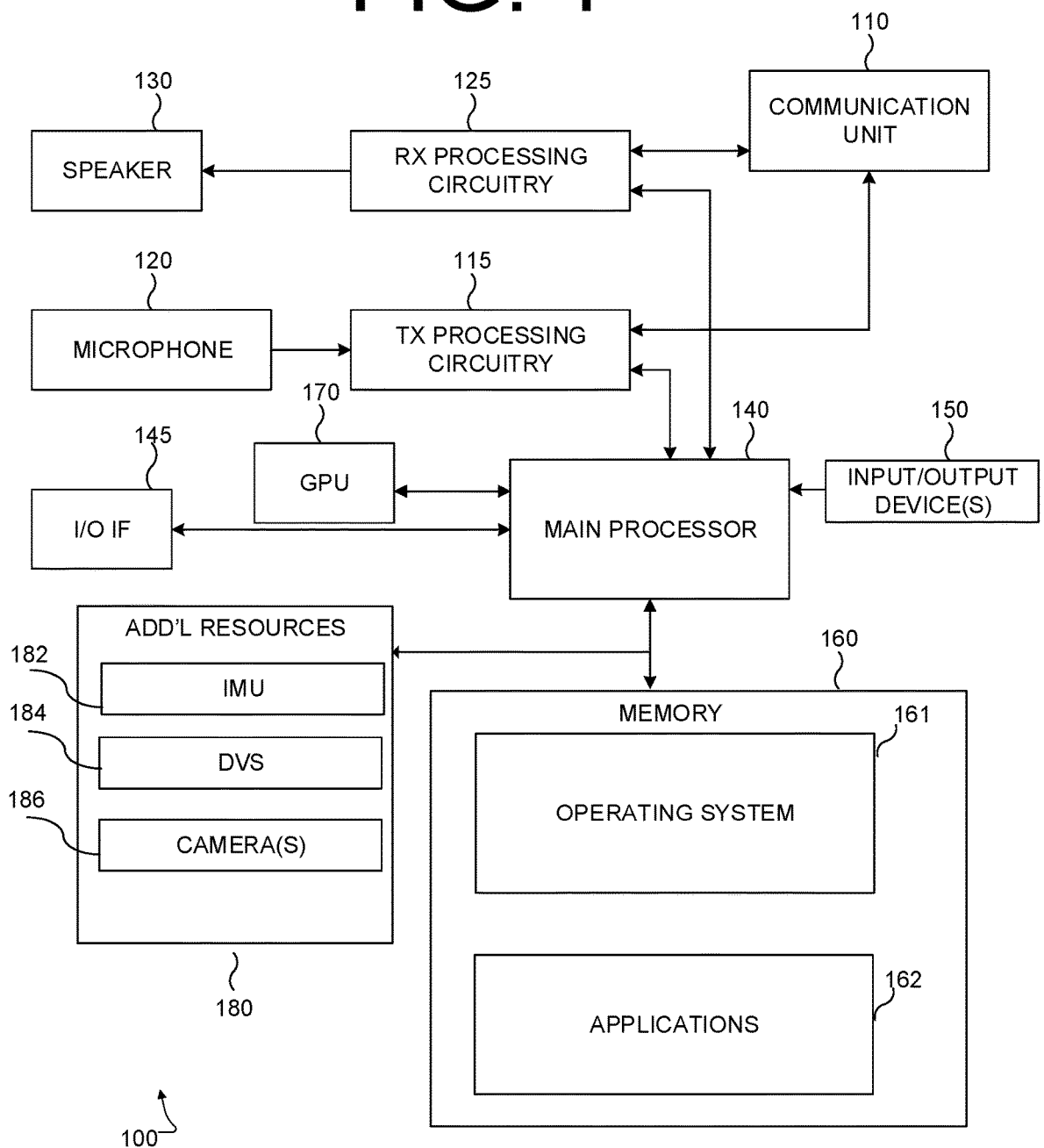
FIG. 1 illustrates an example of an electronic device for implementing resource access control authentication according to embodiments of this disclosure.

FIG. 1 illustrates a non-limiting example of a device 100 for implementing systems and methods for resource access control authentication according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device. For example, device 100 may be implemented, without limitation, as a smartphone, a wearable smart device (such as a smart watch), a tablet computer, a head-mounted display, or through a combination of devices including one or more of the afore-mentioned devices.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume image data from physical objects in a field of view of a camera of electronic device 100 and provide AR or VR content through a display of device 100, or a display of a separate device.

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software. Further, communication unit 110 can, in certain embodiments, serve as an interface for exchanging data between device 100 and other devices (for example, a smart watch) used in implementing resource access control authentication according to various embodiments of this disclosure.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, head mounted displays (HMD), touch screens, mouse(s), track balls or other devices capable of acting as a user interface to allow a user to interact with electronic device 100. In some embodiments, input/output device(s) 150 can include a touch panel, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1. For example, according to certain embodiments, device 100 further includes a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) 184, one or more cameras 186 of electronic device 100.

Although FIG. 1 illustrates one example of a device 100 for implementing resource access control authentication, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
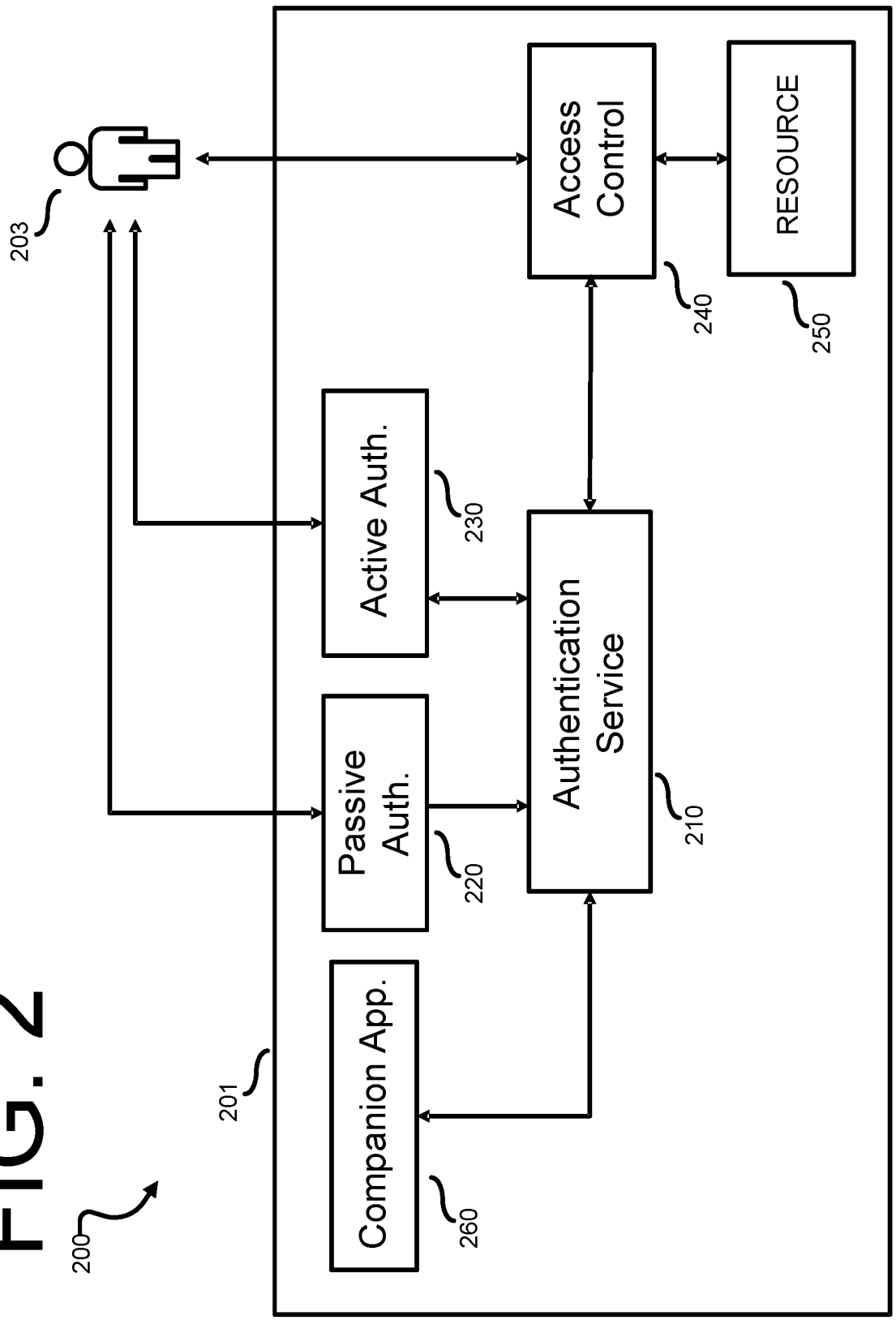
FIG. 2 illustrates an example of an architecture for implementing resource access control authentication according to embodiments of this disclosure.

FIG. 2 illustrates an example of an architecture 200 for implementing resource access control authentication according to various embodiments of this disclosure. The embodiment of the architecture 200 shown in FIG. 2 is for illustration only. Other embodiments could be used without departing from the scope of the present disclosure.

Referring to the non-limiting example of FIG. 2, architecture 200 comprises a first device 201 (for example, device 100 in FIG. 1), and an authenticator 203. According to various embodiments, first device 201 comprises a processor (for example, main processor 140 in FIG. 1), a memory including applications (for example, memory 160 and applications 162), a communication interface configured to link first device with, inter alia, other devices, and one or more sensors (for example, a touchscreen, a fingerprint scanner, or a camera) configured to collect authentication information. Additionally, in various embodiments according to this disclosure, first device 201 comprises one or more resources 250. As used in this disclosure, the term "resource" encompasses sources of data accessed or generated by first device 201 whose access is subject to the control of authenticator 203. Examples of resources 250 include, without limitation, certain sensors of the first device (for example, camera 180, speaker 130 or IMU 182) which can generate potentially sensitive data (for example, image or audio data), as well as certain data maintained within a memory of the first device (for example, address book data, passwords or browsing history data). Examples of resources 250 according to certain embodiments of this disclosure include services (for example, an electronic payment service) or certain in-application functionalities.

Referring to the non-limiting example of FIG. 2, authenticator 203 comprises a source of explicit and/or implicit authentication data which can be accessed by an authentication service (for example, authentication service 210 in FIG. 2) of first device 201. Examples of authenticators 203 according to some embodiments of this disclosure include users, who can provide authentication data through, for example, by entering a personal identification number (PIN), or providing biometric authentication data (for example, facial image data, fingerprints or voice samples). Examples of authenticators 203 according to some embodiments of this device include other devices which can augment, or operate as a proxy for another authenticator (for example, a smart watch providing status data showing it has not been removed from another authenticator's wrist since receiving authentication data). In some embodiments, an authenticator is another device (for example, a device providing a trusted geofencing signal indicating that the device is within a trusted environment).

In certain embodiments of architecture 200, an authentication service 210, passive authentication functionality 220, active authentication functionality 230, access control functionality 240, and companion application 260 are provided by first device 201. According to some embodiments of this disclosure, authentication service 210, passive authentication functionality 220, active authentication functionality 230, access control functionality 240 and companion application 260 are implemented as software (for example, by one or more applications 162 in memory 160 in FIG. 1) on first device 201. In various embodiments, authentication service 210, passive authentication functionality 220, active authentication functionality 230, access control functionality 240 and companion application 260 are implemented in hardware (for example, through a system on a chip ("SoC") or an electrically-erasable programmable read-only memory ("EEPROM")). In some embodiments of architecture 200, authentication service 210, passive authentication functionality 220, active authentication functionality 230, access control functionality 240, and companion application 260 are implemented through a combination of hardware and software.

Referring to the non-limiting example of FIG. 2, authentication service 210 comprises a system service of first device 201, which determines a current value of a security state of first device 201 based on, without limitation, authentication information obtained from passive authentication functionality 220 and/or active authentication functionality 230, and provides the determined current value of the security state of the first device 201 to an access control functionality 240. Based on the current value of the security state of first device 201, in certain embodiments, access control functionality 240 grants or denies access to a resource, or alternatively, seeks additional authentication information. As a non-limiting example, authentication service 210 may determine that a sufficiently short period of time has elapsed since first device 201 (for example, a smartphone) locked the screen, and pass a current value of the security state of first device 201 to access control functionality 240 that access control functionality 240 unlocks the screen of first device 201 in response to detecting motion associated with a user picking up the device. In various embodiments according to this disclosure, authentication service 210 is launched at a boot time of first device 201. Additionally, in some embodiments according to this disclosure, authentication service 210 runs continuously as a background process on first device 201.

Referring to the non-limiting example of FIG. 2, authentication service 210 receives authentication information from one or more of a passive authentication functionality 220 and an active authentication functionality 230. As used in this disclosure, the term "authentication information" comprises information (for example, raw sensor data, or data which has been processed to obtain a determined value (for example, image data which has been processed to determine a confidence score as to whether the image data contains a face associated with an individual) used to determine a current value of a security state of the first device. According to certain embodiments of this disclosure, active authentication functionality 230 comprises control logic (for example, software or hardware) for providing authentication service 210 with one or more predetermined types of authentication information at one or more predetermined intervals. As a non-limiting example, active authentication functionality 230 controls a user-facing camera of first device 201 (for example, camera 186 in FIG. 1) to obtain image data at predetermined intervals (for example, every thirty seconds), which is analyzed to determine a confidence score as to whether the image data contains the face of an authorized user of first device 201. As another non-limiting example, active authentication functionality 230 may, at predetermined intervals, contact and attempt to receive interaction status information from another device. For example, in certain embodiments, the other device may be a smart watch associated with a trusted user, and comprising one or more sensors indicating the watch's location and whether the watch has been removed. Accordingly, the watch may, for certain applications, be a trusted proxy for the user's presence, and information as to the watch's location and whether the watch has been removed comprises authentication information from which a value of a security state for first device 201 can be determined and updated.

In various embodiments according to this disclosure, passive authentication functionality 220 listens for, and provides authentication information to authentication service 210. Referring to the non-limiting example of FIG. 2, in contrast to certain embodiments of active authentication functionality 230, which collect one or predetermined types of authentication information according to a predetermined collection structure (for example, a schedule, or other control logic defining what data to collect and when (for example, conditional rules such as, "if there is insufficient light to collect image data every 30 seconds, collect voice data once a minute")), the type(s) and timing of authentication information obtained by passive authentication functionality 220 are not predetermined. Instead, in certain embodiments, passive authentication functionality 220 operates as a filter for sensor data received from one or more sensors (for example, camera 186, IMU 182, or microphone 120) to identify authentication information within an ongoing stream of sensor data and provide the identified authentication information to authentication service 210. As an illustrative example, passive authentication functionality 220, may, in some embodiments, determine, based on IMU or global positioning system (GPS) sensor data, that first device 201 has moved from a repeatedly visited location associated with a verified user (for example, a user's home) to an unknown location. Accordingly, passive authentication functionality 220 may provide authentication information indicating this unscheduled change in location to authentication service 210 to be used as a factor in updating the value of the current security state of first device 201.

Referring to the non-limiting example of FIG. 2, first device 201 also implements, through software, hardware or a combination thereof, an access control functionality 240. According to certain embodiments, access control functionality 240 acts as a gatekeeper for requests to resources 250. In certain embodiments, for example, embodiments where a user is also an authenticator, requests for access to resources can come from authenticators (for example, authenticator 203). In various embodiments, requests for access to resources 250 can come from applications (for example, permitted applications and malware) on first device 201. As shown in the illustrative example of FIG. 2, access control functionality 240 regulates access (for example, by permitting access, denying access, or soliciting further input from a user) based on a current value of the security state of first device 201. According to some embodiments, access control functionality 240 determines a response to a request for access to a resource of first device 201 based on a comparison of a current value of a security state against one or more predetermined threshold values. In some embodiments according to this disclosure, the threshold values are predetermined based on contextual factors (for example, the resource to which access is sought, application seeking access, time, and location of first device 201).

In certain embodiments according to this disclosure, architecture 200 further comprises a companion application 260. According to various embodiments, companion application is an application (for example, one of applications 162 in FIG. 1) which provides a user interface through which a user of first device can set up and configure a resource access control functionality according to various embodiments of this disclosure. Additionally, in certain embodiments, companion application 260 manages aspects of the setup of authentication service 210, such as connection to other devices and rule updates without inputs provided through a user interface. For example, in certain embodiments, companion application 260 provides an interface through which a user can adjust the control logic for active authentication functionality 230, by, for example, adjusting the frequency with which authentication information is obtained, and the types of data used to generate authentication information. For example, certain users may prioritize battery life and minimizing consumption of system resources relative to maximizing security, and accordingly increase the intervals at which active authentication functionality 230 obtains authentication information.

Similarly, companion application 260 may provide an interface for regulating the sources of sensor data which passive authentication functionality 220 obtains authentication information. For example, certain users may have privacy concerns about authentication service 210 using location data as a factor in determining the current value of a security state of first device 201, and companion application 260 can provide an interface by which users can customize the operation of authentication service 210 to reflect user concerns and preferences.

Additionally, in certain embodiments according to this disclosure, companion application 260 manages notifications (including, for example, requests for explicit authentication information presented on a display of first device 201) regarding authentication issues. Further, in some embodiments, companion application 260 maintains a history (for example, data showing trends in the value of the security state of the device, as well as data indicating the incidence of requests for explicit authentication).

Figure 3:
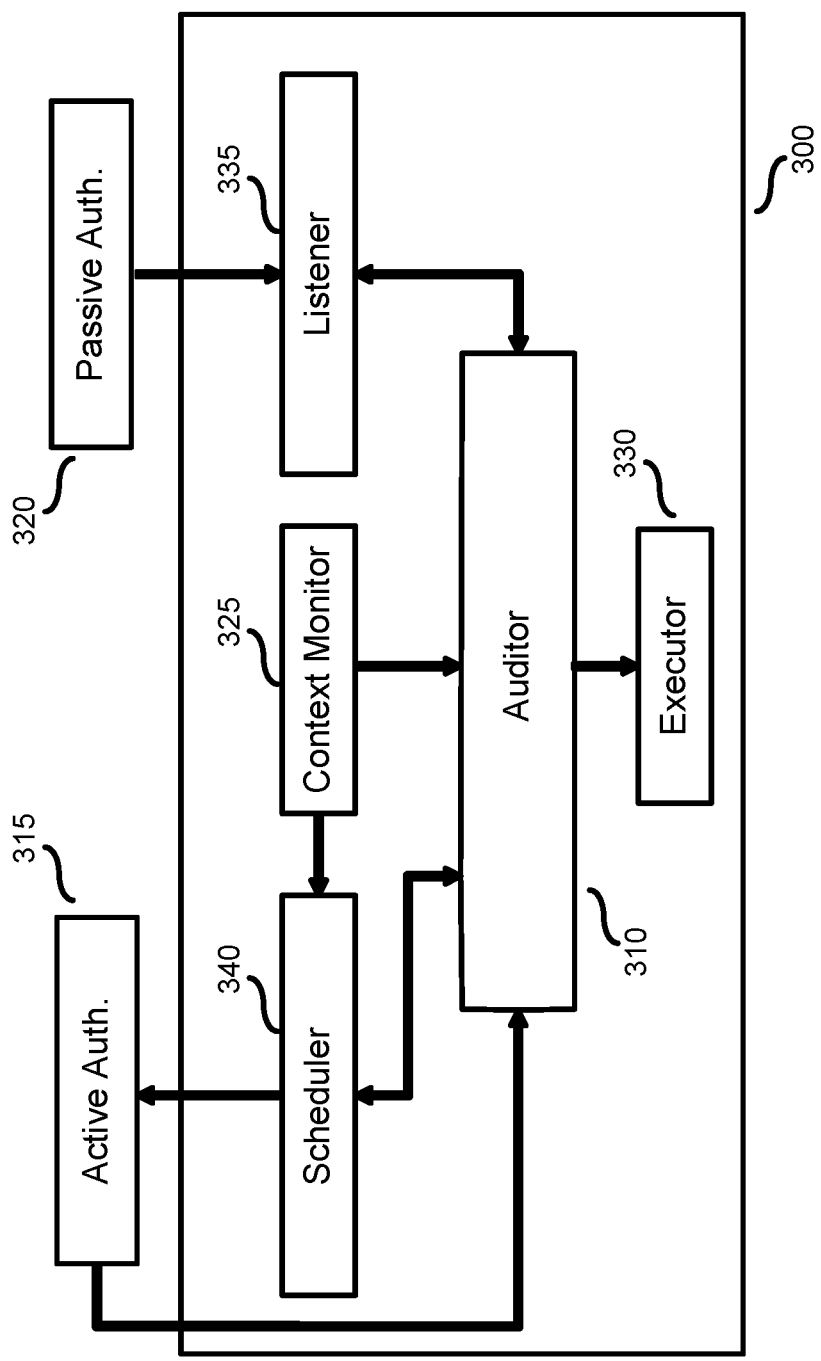
FIG. 3 illustrates, in block diagram format, elements of a continuous authentication service according to various embodiments of this disclosure.

FIG. 3 illustrates, in block diagram format, elements of a continuous authentication service 300 according to various embodiments of this disclosure. The embodiment of the authentication service 300 shown in FIG. 3 is for illustration only. Other embodiments could be used without departing from the scope of the present disclosure.

As shown in the example illustrated in FIG. 3, continuous authentication service 300 comprises a system service which is launched at the boot time of a device (for example, device 100 in FIG. 1 or first device 201 in FIG. 2). As noted elsewhere in this disclosure, continuous authentication service 300 is, in certain embodiments, implemented as software, hardware, or a combination of software and hardware on the device.

As shown in the illustrative example of FIG. 3, continuous authentication service 300 comprises an auditor 310, which implements one or more algorithms to determine a value of a security state of the device. As used in this disclosure, the term "value of a security state of the device" encompasses a quantification or representation (for example, a grade or other classification, e.g., "A," "B," "C" or "D") of a probability that the device is in a state where, at a minimum, a current user is an authenticated and authorized user of the device.

According to certain embodiments, auditor 310 receives as inputs, authentication from an active authentication functionality 315 (for example, active authentication functionality 230 in FIG. 2) and a passive authentication functionality 320 (for example, passive authentication functionality 220 in FIG. 2) and outputs, based on the application of one or more algorithms, one or more of a determined value of the current security state of the device or an action to be taken (for example, displaying a user prompt requesting that the user provide explicit authentication information).

In some embodiments according to this disclosure, an algorithm for determining the current value of the security state comprises a multi-variable function of a variety of factors affecting the current security state of the device. A non-limiting example of such a multi-variable function is:

$$S = f(r, t, e, p) \quad \text{(Eqn. 1)}$$

Where r is the rate at which the value of the security state decreases as a function of time. In certain embodiments, the value of the security state of the device decays linearly with time. In some embodiments, the value of the security state as a function of time decays non-linearly.

Where t is the time elapsed since the last determination of the current value of the security of the device was calculated.

Where e represents values associated with a sequence of events affecting the calculated current value of the security state. Examples of values associated with a sequence of events affecting the calculated current value of the security state include, without limitation, changes in device context (e.g., moving the device from a familiar, or trusted location, such as a home or geofenced workplace), or repeated failures to obtain reliable authentication information (for example, image data that is too dark to recognize faces) by active authentication functionality 315 and/or passive authentication functionality 320.

Where p represents a policy for adjusting the weighting of values e. According to certain embodiments, p comprises a set of parameters which can be tuned or adjusted through a companion application (for example, companion application 260 in FIG. 2) on the device. As one non-limiting example, p comprises a set of temporal weighting factors applied to events in e, such as entry of an incorrect PIN. In some embodiments, p assigns a heavy temporal weight to an incorrect PIN event, and the entry of an incorrect PIN affects the calculation of the current value of the security state for a long period of time. In some embodiments, recognizing the possibility of user error, p assigns a light temporal weight to an incorrect PIN event, and the entry of an incorrect PIN does not affect the calculation of the current value of the security state for a long period of time. In certain embodiments, p and e are co-dependent, and the weight assigned by p to an event in e depends on other values in e. For example, in a situation where e includes multiple consecutive incorrect PIN entries, p assigns an especially heavy temporal weighting factor to the set of incorrect PIN entries. Alternatively, the successive incorrect PIN operations may be recorded as context information by context monitor 325. In practical terms, this may mean that the continuous authentication service 300 frequently requires explicit authentication information for a period of time, as if the user had to regain the device's trust.

According to certain embodiments, continuous authentication service 300 receives authentication information through an active authentication functionality 315. As used in this disclosure, the term "active authentication functionality" encompasses processes by which continuous authentication service 300 causes other components associated with the device whose security state continuous authentication service 300 monitors, to provide continuous authentication service 300 with authentication information. In certain embodiments, active authentication functionality 315 implemented through requests for authentication information (for example, the value of a facial recognition operation based on image data from a recent image captured by a user-facing of a device) triggered by components of continuous authentication service 300, including, without limitation, context monitor 325 and scheduler 340. According to certain embodiments, active authentication functionality 315 is triggered when certain conditions are satisfied. In some embodiments, the conditions triggering active authentication functionality 315 are temporal (for example, a set interval between triggering events). In some embodiments, active authentication functionality 315 is triggered if certain contextual conditions are satisfied. As an illustrative example, in certain embodiments, authentication operations based on face and image data are scheduled to be performed at predetermined intervals. However, to reduce power consumption, face and/or iris authentication may only be performed if a human face is first detected in current image data. If a face is detected in the image data, than an active authentication based on analysis of face/iris information in the image data will be triggered. If a face is not detected, then an active authentication based on face/iris information in image data will not be triggered, thereby saving power consumption. In certain embodiments, active authentication functionality 315 is triggered through a combination of temporal and contextual conditions. As a non-limiting example, in some embodiments, active authentication functionality 315 is configured such to trigger the capture and analysis of image data from a user-facing camera to see if a registered user's face is detected, except if a map application is open, and other sensor data indicates that the device is in a moving vehicle.

Referring to the non-limiting example of FIG. 3, scheduler 340 manages the timing (e.g., how often is active authentication triggered) and mode (for example, determining the method of collecting authentication information) of active authentication functionality 315. According to certain embodiments, scheduler 340 interfaces with auditor 310, and receives information regarding the current value of the security state of the device from auditor 310. Additionally, scheduler 340 interfaces with context monitor 325 to receive, without limitation, information regarding the available authentication methods, given the current context of the device. For example, in certain embodiments, context monitor 325 determines that, given the ambient light level, it is impossible to perform an authentication based on image data (i.e., it is too dark to take a good photo), and notifies scheduler 340 that image-based authentication is not currently an option. According to certain embodiments, scheduler 340 determines the timing and mode of triggering active authentications by implementing one or more algorithms or decision logic (as one non-limiting example, the decision logic described with reference to FIG. 6 of this disclosure) which considers, without limitation, the current security state of the device, the available authentication methods given the current context of the device, and one or more operational policies. In certain embodiments, the operational policies comprise, for example, achieving a predetermined balance between usability and security, or minimizing the value of another operational parameter of interest (for example, the frequency with which the device performs an explicit authentication, or consumes battery power performing continuous authentication).

In some embodiments, continuous authentication service 300 includes context monitor 325, which is certain embodiments, comprises a process or sub-process of continuous authentication service 300 which collects contextual information and passes the collected contextual information to auditor 310 and scheduler 340. Examples of contextual information collected and passed to scheduler 340 or auditor 310, include, without limitation, current time information at the device's current location (for example, to tune a continuous authentication functionality to account for the device moving across time zones), information regarding the device's current location, information reflecting user preferences (for example, whether a user prefers heightened security or heightened usability), environmental conditions (for example, whether it is dark, or whether the device is in a moving vehicle), a device status (for example, information identifying applications currently running on the device, an authentication history (for example, whether a user has incorrectly entered a PIN) and security policies (for example, rules requiring explicit authentication in certain areas (for example, when the device is connected to a public wireless network)).

As shown in the illustrative example of FIG. 3, in addition to active authentication functionality 315, auditor 310 receives authentication information from a passive authentication functionality 320. In certain embodiments according to this disclosure, passive authentication functionality 320 is implemented as a series of modules listening for authentication information provided through a user's interaction with applications on the device. In certain embodiments, the modules are implemented separately from continuous authentication service 300. In some embodiments, the modules providing the passive authentication functionality are implemented as a suite of listeners included as part of continuous authentication service 300. As a non-limiting example, certain financial services applications (for example, mobile banking applications which allow users to transfer money, check balances, and pay bills) require one or more authentications (for example, a fingerprint scan at login) to access the applications. In some embodiments, one or more modules of listener 335 are configured to capture the results of authentications performed as part of the flow of the applications utilized by the user, and report the captured results back to auditor 310 as authentication information to be used in calculating the current value of the security state of the device.

As noted elsewhere in this disclosure, in certain embodiments, auditor 310 outputs one or more of a determined value of the current security state of the device or an action to be taken. Referring to the non-limiting example of FIG. 3, the outputs of auditor 310 are provided (for example, as a callback) to executor 330. According to certain embodiments, executor 330 is configured to perform one or more predefined actions based on the current value of the security state of the device, as determined by auditor 310. According to certain embodiments, executor 330 handles incoming requests to access resources of the device based on the application of rules or other decision logic of executor 330 to the current value of the security state of the device. If, as applied to the decision logic of executor 330, the current value of the security state satisfies a value associated with a security requirement for accessing the resource, executor 330 permits the requested access. If, as applied to the decision logic of executor 330, the current value of the security state to satisfy a value associated with the security requirement for accessing the requested resource, executor 330 denies access to resource. Additionally, executor 330 may provide a companion application (for example, companion application 260 in FIG. 2) with a notification of the denial of access. As an illustrative example, a user may attempt to access previously displayed of a device, for example, by attempting to unlock the screen of the device by picking the device up. Depending upon the current value of the security state, executor 330 may grant the requested access, and unlock the screen of the device in response to the device being picked up, or deny the requested access.

Additionally, in certain embodiments according to this disclosure, executor 330 takes action while access to a resource is ongoing based on the application of executor 330's current value of the security state. For example, if auditor 310 receives authentication information (for example, data from passive authentication functionality 320 showing an unfamiliar fingerprint touching a fingerprint scanner) while a resource is being accessed, causing the value of the security state to be suddenly reduced from its previous value, executor 330 may immediately lock the screen of the device. Similarly, if, while a resource is being currently accessed, auditor 310 receives authentication information consistent with an authenticated and authorized user's continued use of the device, and the value of the security state remains above a relevant threshold value, executor 330 will take no action, and will instead allow the access to the resource to continue.

Figure 4:
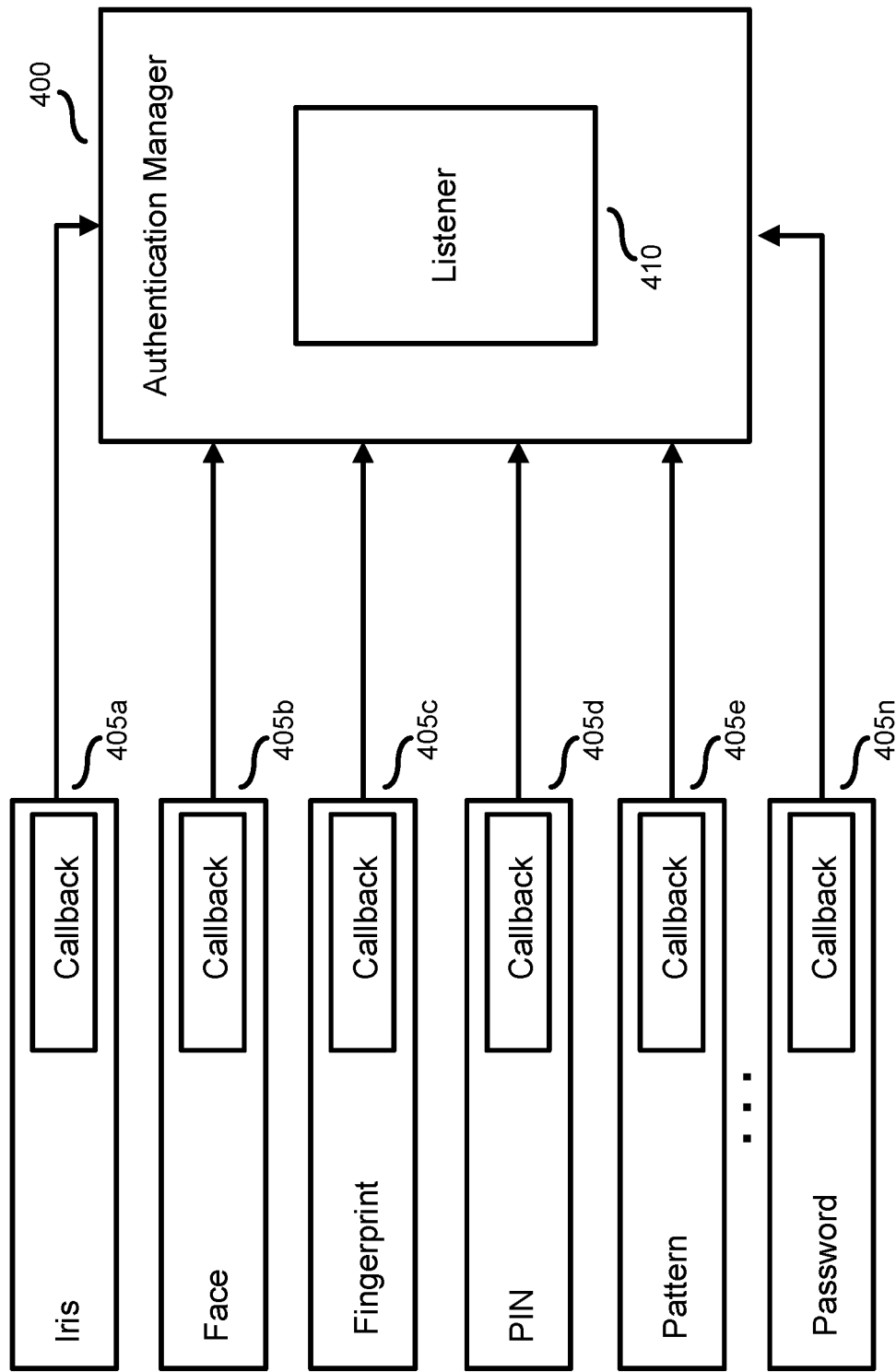
FIG. 4 illustrates, in block diagram format, aspects of an authentication manager for performing passive authentication according to embodiments of this disclosure.

FIG. 4 illustrates, in block diagram format, aspects of an authentication manager 400 for implementing a passive authentication functionality according to one or more embodiments of this disclosure. The embodiment of authentication manager 400 shown in FIG. 4 is for illustration only. Other embodiments could be used without departing from the scope of the present disclosure.

Referring to the non-limiting example of FIG. 4, authentication manager 400 manages the capture and reporting to an authentication service (for example, continuous authentication service 300 in FIG. 3) of authentication events (for example, a fingerprint scan conducted as part of an authentication process for an in-application purchase) arising in the context of applications running on the device. In certain embodiments, authentication manager 400 is implemented as software (for example, as part of continuous authentication service 300 in FIG. 3). In various embodiments, authentication manager 400 is implemented as hardware (for example, as a SoC or programmable field gate array ("FPGA")). In some embodiments, authentication manager 400 is implemented through a combination of hardware and software.

According to certain embodiments, applications running on a device (for example, first device 201 in FIG. 2) implementing a continuous authentication functionality perform security checks through application programming interface (API) calls to security tools provided by a framework (for example, a framework provided by the Android SDK or the AFNetworking library for iOS). As shown in FIG. 4, a framework may provide a device with n (n being an arbitrary integer number) security tools which applications can call to implement a security check. Examples of such framework-provided security tools include, without limitation, an iris scan functionality 405*a*, a facial recognition functionality 405*b*, a fingerprint scanning functionality 405*c*, a PIN checking functionality 405*d*, a use pattern recognition (checking for swipe patterns consistent with a certain user, such as swipe inputs typically being entered in a particular portion of the screen), and a password management functionality 405*n*. In certain embodiments, in-application calls to security tools 405*a* through 405*n* trigger callbacks (or other notifications) which provide the results of the in-application calls to security tools 405*a* through 405*n* to authentication manager 400. In some embodiments, the results of the in-application calls are passed from authentication manager 400 to a continuous authentication service (for example, authentication service 210 in FIG. 2).

Figure 5:
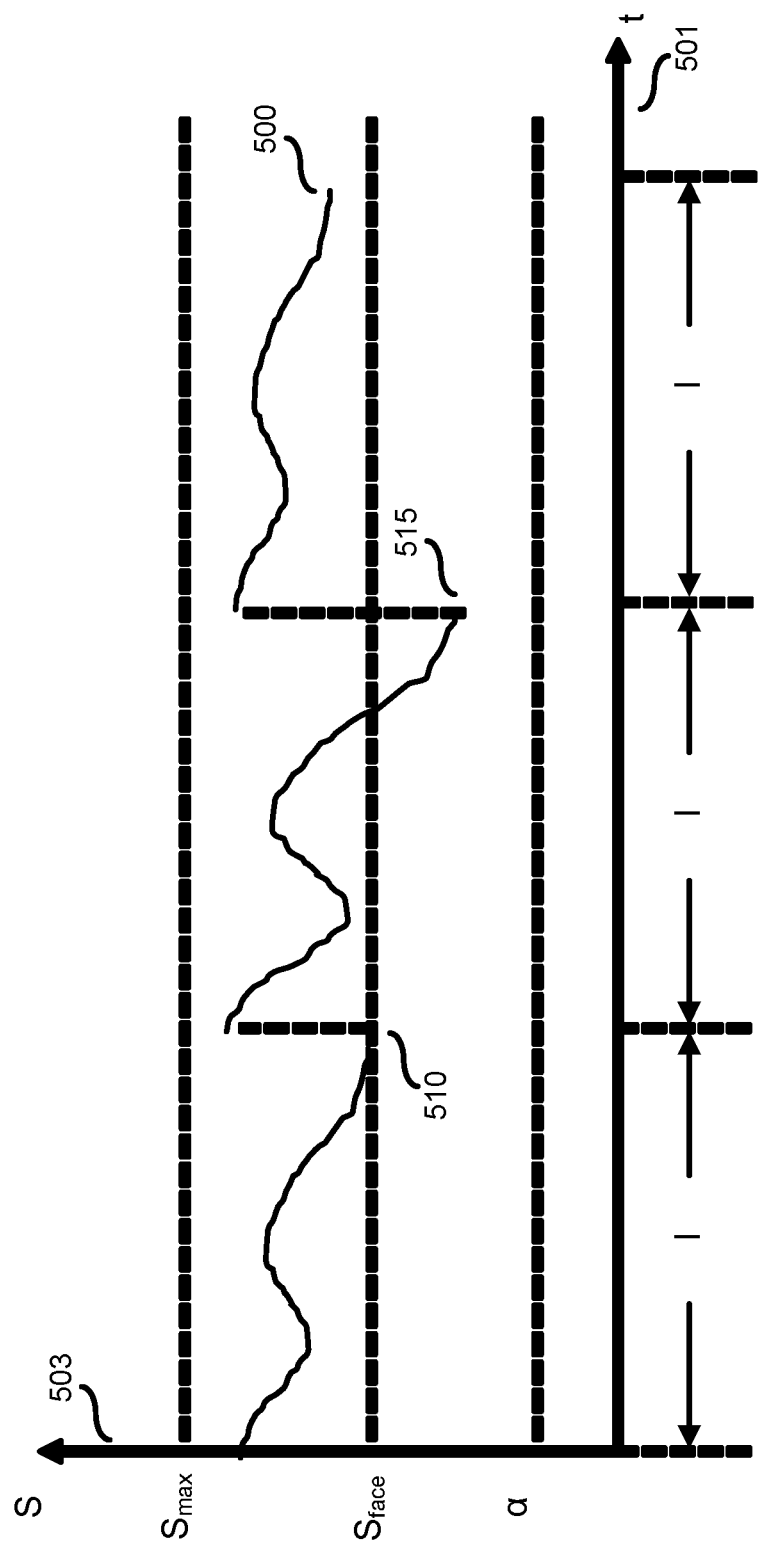
FIG. 5 illustrates aspects of the change over time in a current value of a security state as determined by a continuous authentication service according to embodiments of this disclosure.

FIG. 5 illustrates aspects of the change over time in a current value of a security state as determined by a continuous authentication service according to certain embodiments of this disclosure.

Referring to the non-limiting example of FIG. 5, a plot 500 of the current value of the security state of a device, as determined by a continuous authentication service (for example, continuous authentication service 300 in FIG. 3) is shown. In this illustrative example, plot 500 represents the current value S of the security state (represented on vertical axis 503) over time t (represented on horizontal axis 501). In this illustrative example, three relevant threshold values of S: $\alpha$, $S_{face}$, and $S_{max}$ are shown. In some embodiments, a comprises a required minimum of S to access specified resources of the device. When the current value of S is determined to be above a (i.e., $S \geq \alpha$), the continuous authentication service, or a sub-component thereof (for example, executor 330 in FIG. 3) permits requests for access to the specified resources. Similarly, when the current value of S is determined to fall below $\alpha$ (i.e., $S < \alpha$), the continuous authentication service denies access to the specified resources, by, for example, locking the touchscreen of the device or discontinuing access to an application utilizing the specified resources, and requiring explicit authentication information (for example, presenting a user prompt to provide a password or authenticating biometric information, such as a fingerprint) to regain access to the specified resources.

In certain embodiments according to this disclosure, a continuous authentication service, or a module thereof (for example, scheduler 340 in FIG. 3) attempts to optimize the performance of the authentication service by minimizing the number of requests for explicit authentication information, as well as the power consumption of the authentication service. Recognizing that, at a certain point, the authenticity of a user is sufficiently well established that additional authentication operations are unnecessary (for example, if a user has entered a correct PIN, and the device determines that image data from a user-facing camera matches the user's face, further authentication operations, such as a fingerprint or iris scan become redundant), the continuous authentication service sets an upper threshold, $S_{max}$, above which, no further authentication operations are conducted. Additionally, to conserve power and other system resources, the continuous authentication service may provide one or more thresholds for computationally expensive authentication operations (for example, checking to see if the face of a recognized user is detected in image data), wherein certain authentication operations are not performed unless the value of S drops below a certain threshold. As shown in FIG. 5, $S_{face}$ provides a non-limiting example of a threshold value of S for a specific type of authentication operation. In this illustrative example, the decision logic for implementing an active authentication functionality (for example, active authentication functionality 230 in FIG. 2) holds off on triggering facial recognition operations until the value of S drops below $S_{face}$.

In certain embodiments, the decision logic for triggering an active authentication functionality is based on a comparison of a utility score for an active authentication operation relative to a threshold value. According to various embodiments, the utility score for the active authentication operation is determined based on at least the following three components: (1) potential gain; (2) probability of success; and (3) effect on user experience. In this illustrative example, potential gain refers to the potential "lift" in the current value of S in response to a successful authentication. For example, given the difficulty in spoofing a face and iris scan, a successful face/iris scan may be associated with a high potential "lift" in the value of S. According to some embodiments, probability of success refers to a predicted likelihood that the authentication operation will yield a determinative result. Returning to the non-limiting example of an iris scan, in some embodiments, confounding factors, such as sensitivity to ambient light levels or camera shake may mean that face/iris scans have a comparatively low probability of returning a determinative result as to whether or not a user is an authenticated user. According to various embodiments, the effect on user experience comprises a factor associated with the predicted disruption or reduction in the quality of user experience at the device associated with a given active authentication operation. As a non-limiting example, a face/iris recognition operation using a user-facing light to assist in generating image data may be associated with a large user experience effect factor, while a similar authentication operation which does not require illuminating a user's face may be associated with a comparatively smaller user experience effect factor.

Referring to the non-limiting example of FIG. 5, active authentication operations (for example, authentication operations triggered by a scheduler, such as scheduler 340 in FIG. 3) are conducted periodically at intervals I. Additionally, in this example, the continuous authentication service seeks to minimize the frequency with which the continuous authentication service either denies access to specified resources (for example, by locking a screen of the device) by repeatedly calculating $S_t$ and applying the decision logic to the calculated value of $S_t$ shown below:

(1)

$$S_t = S_0 - at + f(t, E), t \geq 0 \quad \text{(Eqn. 2)}$$

(2)

$$\begin{cases} Lock & \text{if } S_t < \alpha \\ FaceAuth & \text{if } S_t \in [S_{face}, S_{max}] \\ IrisAuth & \text{if } S_t \in [\alpha, S_{face}] \end{cases} \quad \text{(Eqn. 3)}$$

(3)

$$\begin{cases} S_t \mathrel{+}= G_{face} & \text{if success} \\ Ignore & \text{if fail} \end{cases} \quad \text{(Eqn. 4)}$$

4

$$\begin{cases} S_t \mathrel{+}= G_{iris} & \text{if success} \\ Ignore & \text{if fail} \end{cases} \quad \text{(Eqn. 5)}$$

Where $S_t$ comprises the value of S at a time t, occurring after an initial time, $S_0$. Where a comprises a rate at which S decreases as a function of time. In this non-limiting example, the value of S decreases linearly over time. In some embodiments, the time-related decrease in S follows a different function (for example, an exponential decay). Where E comprises a sequence of events (for example, authentication information provided by a passive authentication functionality) occurring in the interval between $S_t$ and $S_0$. Where $f(t, E)$ comprises a function calculating a component of the current value of the security state of the device based on events occurring between time 0 and time t. Where $G_{face}$ comprises a predetermined increase in the value of S in response to a successful facial recognition operation. Where $G_{iris}$ comprises a predetermined increase in the value of S in response to a successful iris recognition operation.

In certain embodiments applying the set of decision logic rules numbered (2), above, if $S_t$ is below α, then the device is locked. If $S_t$ falls between $S_{face}$ and $S_{max}$, then a facial authentication operation is attempted at the start of the next authentication interval I. If $S_t$ falls between α and $S_{face}$, then an iris scan authentication operation is attempted at the start of the next authentication interval I.

According to certain embodiments applying the set of decision logic rules numbered (3), above, if an facial authentication operation is a success (for example, a face associated with an authorized user is detected), then the value of $S_t$ is increased by predetermined value $G_{face}$, as shown at time 510 in FIG. 5. Similarly, if the facial authentication operation is unsuccessful, in certain embodiments, the outcome of the facial authentication operation is ignored. It should be noted that, while Equations (2) through (5) describe decision logic for performing authentication operations using face and iris data, embodiments according to this disclosure are not so limited, and embodiments employing similar scoring and decision logic for performing other authentication operations.

According to various embodiments applying the set of decision logic rules numbered (4) above, if an iris authentication operation is a success (for example, an iris pattern associated with an authorized user is detected), then the value of $S_t$ is increased by predetermined value $G_{iris}$, as shown at time 515 in FIG. 5. Similarly, if the iris authentication operation is unsuccessful, in certain embodiments, the outcome of the iris authentication operation is ignored.

In some embodiments according to this disclosure, the value of $S_t$ is updated at the start of each authentication interval I, and the determined value of $S_t$ applies $f(t, E)$ to the authentication related events occurring in the previous authentication interval. In various embodiments, the value of $S_t$ is updated in between the start times of authentication interval, and in response to each authentication related event.

Figure 6:
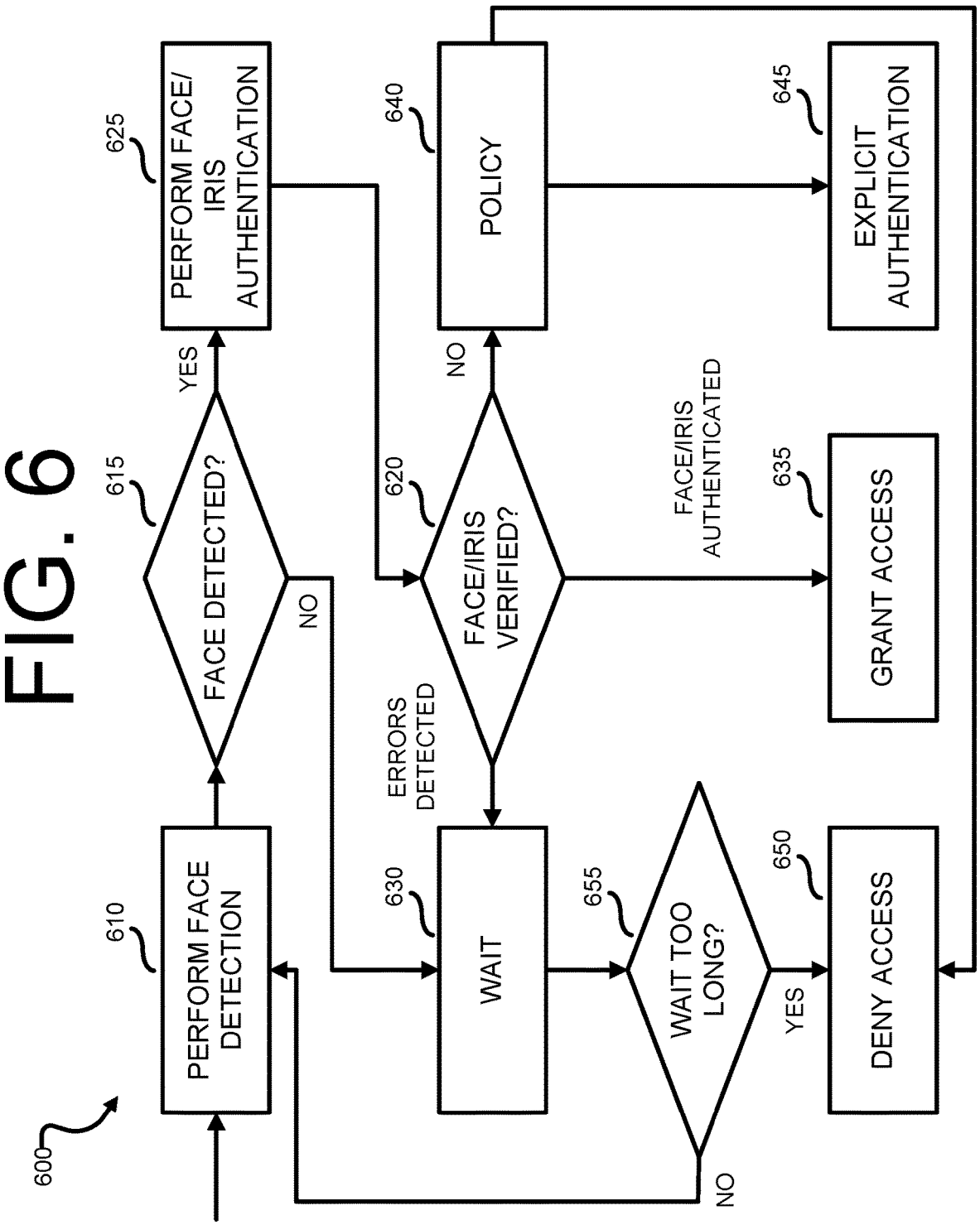
FIG. 6 illustrates an example of aspects of control logic for implementing an active authentication functionality according to embodiments of this disclosure.

FIG. 6 illustrates an example of aspects of control logic 600 for implementing an active authentication functionality according to some embodiments of this disclosure. The embodiment of the control logic 600 shown in FIG. 6 is for illustration only. Other embodiments could be used without departing from the scope of the present disclosure. The control logic 600 can be implemented through one or more components (for example, scheduler 340 in FIG. 3) of a continuous authentication service (for example, continuous authentication service 300 in FIG. 3).

According to certain embodiments, at operation 610, a continuous authorization service of a device (for example, first device 201 in FIG. 2) initiates a sequence of operations associated with active authentication using a face detection operation, instructing one or more cameras of the device to capture image data.

As shown in the illustrative example of FIG. 6, following operation 610, control logic 600 proceeds to operation 615, where a threshold, or gating determination is performed as to whether a face is detected in the image data. If a face is detected in the image data, control logic 600 proceeds to operation 625, where the image data is further analyzed to generate an output as to the extent to which the face and iris information in the image data is associated with an authenticated user. If a face is not detected in the image data collected as part of operation 610, control logic 600 proceeds to operation 630, where the authentication service waits for a predetermined period, in the hope that a face can be detected in later-captured image data. According to certain embodiments, performing a face/iris analysis on image data in which a face has not been detected presents an unacceptable likelihood of wasting power and processor resources.

According to certain embodiments, at operation 620, a determination of whether the output of operation 625 verifies that the face and iris information in the image data is associated with an authenticated user. If the face or iris data is determined to be associated with a authenticated user, control logic proceeds to operation 635, wherein access to a specified resource is permitted—either through a new grant of access, or maintaining a previously granted access. If at operation 620, the determination of whether the face or iris data is associated with an authenticated user yields an error condition, control logic 600 proceeds to operation 630, where the authentication service waits for a predetermined period, in the hope that a face can be detected in later-received image data. If, at operation 620, the determination of whether the face or iris data results in a conclusive determination that the face or iris data is not associated with a verified user, control logic 600 proceeds to operation 640, wherein the continuous authentication service applies a policy (for example, a policy managed through companion application 260 in FIG. 2) for handling detection of unverified users. Depending on the current context of the device and the rules of the policy, control logic 600 either proceeds to operation 645, wherein the device presents a user with an explicit authentication request, or operation 650, wherein the device denies a user access to the specified resources.

According to certain embodiments, after waiting for a predetermined period, control logic 600 proceeds from operation 630 to operation 655, wherein the continuous authentication service performs a determination of whether the authentication service has waited too long to perform an active authentication based on an analysis of face/iris information in image data. If the authentication service has not waited too long (for example, the current value of the security state is still above a threshold value), control logic 600 reverts back to operation 610. If, however, the authentication service has waited too long (for example, the current value of the security state has dropped below a threshold value while waiting for an opportunity to get image data in which a face is detected), control logic proceeds to operation 655, wherein access is denied. According to certain embodiments, the operations previous to operation 655 may be performed quickly or otherwise at a time such that the value of the security state of the device is sufficiently above a lower threshold (for example, a in FIG. 5), that the time-based decrease (for example, a in FIG. 5) of the value of the security state will not cause the value of the security state to drop below the lower threshold in the time required to perform a new face detection and analyze the results of same. If, at operation 655, it is determined that there is sufficient opportunity to collect and analyze fresh face detection data, control logic 600 returns to operation 610. If, however, at operation 655, it is determined that there is not sufficient opportunity to collect and analyze new face detection data, control logic 600 proceeds to operation 650, and access to one or more specified resources is denied or otherwise cut off.

Figure 7:
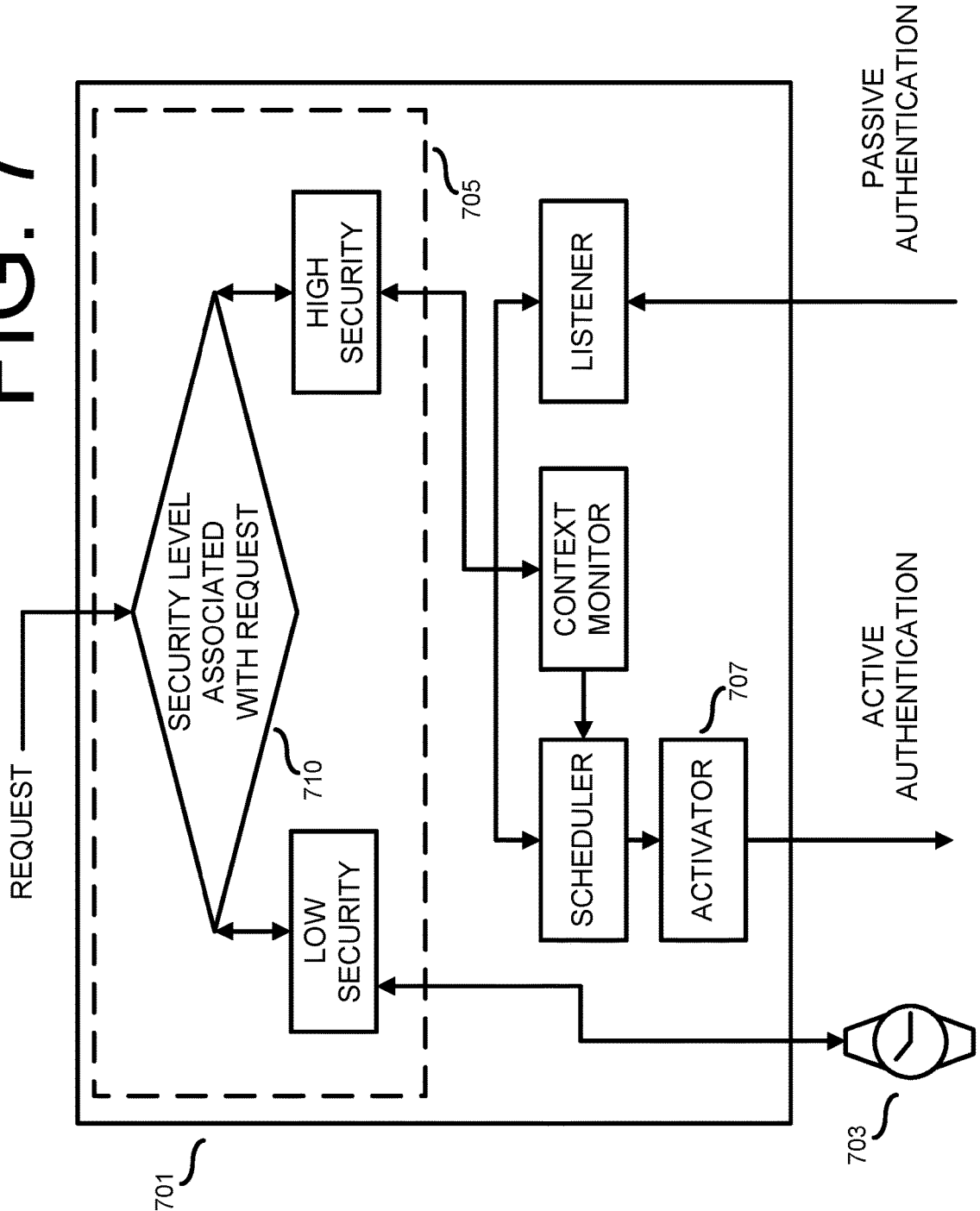
FIG. 7 illustrates aspects of an architecture and control logic for implementing resource access control authentication using a second device according to embodiments of this disclosure.

FIG. 7 illustrates aspects of an architecture and control logic 700 for implementing resource control authentication using a second device according to certain embodiments of this disclosure. The embodiment of the architecture and control logic 700 shown in FIG. 7 is for illustration only. Other embodiments could be used without departing from the scope of the present disclosure.

The architecture and control logic 700 comprises a continuous authentication service 701 embodied on a first device (for example, device 100 in FIG. 1) and a separate device, second device 703. According to certain embodiments of this disclosure, first device implements, either through software, hardware or combinations thereof, components of continuous authentication service 701 (for example, continuous authentication service 300 in FIG. 3). As shown in the illustrative example of FIG. 7, the first device implements as part of continuous authentication service 701, without limitation, a scheduler (for example, scheduler 340 in FIG. 3), a context monitor (for example, context monitor 325 in FIG. 3), one or more listeners (for example, listener 335 in FIG. 3). According to certain embodiments, first device 701 also implements an activator 707, which operates to trigger operations by components (for example, instructing a camera to obtain image data) of first device 701 associated with performing active authentication. Additionally, and as shown in FIG. 7, the first device implements an active authentication functionality (for example, active authentication functionality 315 in FIG. 3) and a passive authentication functionality (for example, passive authentication functionality 320 in FIG. 3).

According to certain embodiments, continuous authentication service 701 further comprises a security state determinator 705 to facilitate the use of second device 703 as a trusted source of authentication information for controlling access to resources of first device. In some embodiments, second device 703 is an electronic device capable of determining interaction status information and reporting same to the first device. As used in this disclosure, the term "interaction status information" encompasses information regarding an authenticator's (for example, authenticator 203 in FIG. 2) authenticated interactions with second device 703. As a non-limiting example, second device 703 is a "smart watch" which includes a sensor that detects when the device is placed on, and removed from, a user's wrist. In this illustrative example, information showing that: a.) the authenticator placed second device 703 on her wrist, b.) logged into second device 703 through an interface (for example, companion application 260 in FIG. 2) provided by continuous authentication service 701 on the first device, and c.) has not removed second device 703 from her wrist, would be one species of interaction status information of second device 703.

In some embodiments, security state determinator 705 performs a first-level sorting of requests for access to resources of the first device. As shown in the non-limiting example of FIG. 7, security state determinator 705 implements control logic for determining which access requests can be granted based on interaction status information from second device 703, and which access requests require a determination of the current value of the security state of the first device.

According to various embodiments, in response to receiving a request for access to one or more resources of the first device, security state determinator 705 implements operation 710, wherein a determination is performed as to the security level associated with the access request. In certain embodiments, the determination performed at operation 710 is based on a mapping of the requested resource to an assigned security profile (for example, accessing the screen is a low security request, while accessing a mobile wallet is a high security request). In some embodiments, the determination performed at operation 710 is informed by contextual data (for example, the location of the device and a history of recent authentication events).

As shown in the illustrative example of FIG. 7, if, at operation 710, security state determinator 705 determines that the access request is a low security access request, continuous authentication service 701 contacts second device 703 to request interaction status information from second device 703. According to certain embodiments, security state denominator receives, via a dedicated communication channel (for example, a channel implemented via BLUETOOTH® or another short-range communication protocol), current interaction status information from second device 703. According to certain embodiments, continuous authentication service 701 grants or denies the low security access request based on the interaction status information from second device 703.

According to certain embodiments, if, at operation 710, security state determinator 705 determines that the access request is a high security access request, continuous authentication service 701 calculates the current value of the security state based, at least in part, on authentication information received by continuous authentication service 701 through an active authentication functionality and/or a passive authentication functionality. In certain embodiments, interaction status information from second device 703 is provided to one or more modules of a continuous authentication service 701 which manage the triggering of active authentication operations and determine the current value of the security state of the first device. For example, in certain embodiments, a scheduler (for example, scheduler 340 in FIG. 3) of continuous authentication service 701 may receive interaction status information, and in cases where the interaction status information points towards the presence of a reasonable proxy for an authenticator in communication with the first device, may increase an interval between triggering active authentication operations. In some embodiments, receipt of interaction status information from second device 703 may be included as event data (for example, E in equation (1) of this disclosure) included in a determination of a current value of a security state.

FIG. 8 illustrates operations of a method 800 for performing resource access control authentication according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

Referring to the non-limiting example of FIG. 8, at operation 805, a first device (for example, first device 201 in FIG. 2), launches a continuous authentication service (for example, continuous authentication service 300 in FIG. 3) at the boot time of the first device. In various embodiments according to this disclosure, the continuous authentication service comprises an auditor (for example, auditor 310 in FIG. 3), a scheduler (for example, scheduler 340 in FIG. 3), one or more listeners (for example, listener 335 in FIG. 3), a context monitor (for example, context monitor 325 in FIG. 3) and an executor (for example, executor 330 in FIG. 3). According to certain embodiments, subsequent to being launched at operation 805, the continuous authentication service runs continuously in the background on the first device.

In certain embodiments, at operation 810, the continuous authentication service receives authentication information. According to certain embodiments, the authentication information received at operation 810 comprises one or more of explicit authentication information or implicit authentication information. As used in this disclosure, the term explicit authentication information encompasses authentication information obtained in response to a prompt to a user triggered by the continuous authentication service (or a component thereof) to provide a specified type of authentication information. As a non-limiting example, fingerprint data obtained in response to a security prompt would be an example of explicit authentication information.

In certain embodiments according to this disclosure, at operation 815, the continuous authentication service receives a request for access to a resource of the first device. According to various embodiments, the request for access received at operation 815 can be a request for new access to the resource. In certain embodiments, the request for access received at operation 815 can be for continued access to the resource of the first device.

As shown in the non-limiting example of FIG. 8, at operation 820, the continuous authentication service, or a module thereof (for example, auditor 310 in FIG. 3), determines a current value of a security state (for example, S in FIG. 5) of the first device based on a time interval between a receipt time of authentication information and a current time. As discussed with reference to certain embodiments (for example, embodiments shown in FIG. 5), the extent to which authentication information accurately reflects the real security state of a device can deteriorate over time. While a successful fingerprint scan taken five seconds ago, in many cases, reasonably assures that the current user of a first device is authenticated and authorized to use the device, it provides less trustworthy assurances that, five minutes later, the current user is still an authenticated authorized user.

According to various embodiments of this disclosure, at operation 825, the continuous authentication service, or a module thereof (for example, executor 330 in FIG. 3) controls access to the resource based on the current value of the security state, as determined at operation 820. In some embodiments, the continuous authentication service allows access to the requested resource (for example, as in operation 635 in FIG. 6) based on the current value of the security state. In certain embodiments, the continuous authentication service denies access to the requested resource (for example, as in operation 650 in FIG. 6). In various embodiments, at operation 825, the continuous authentication service seeks explicit authentication operation (for example, as in operation 645 in FIG. 6).

Figure 9A:
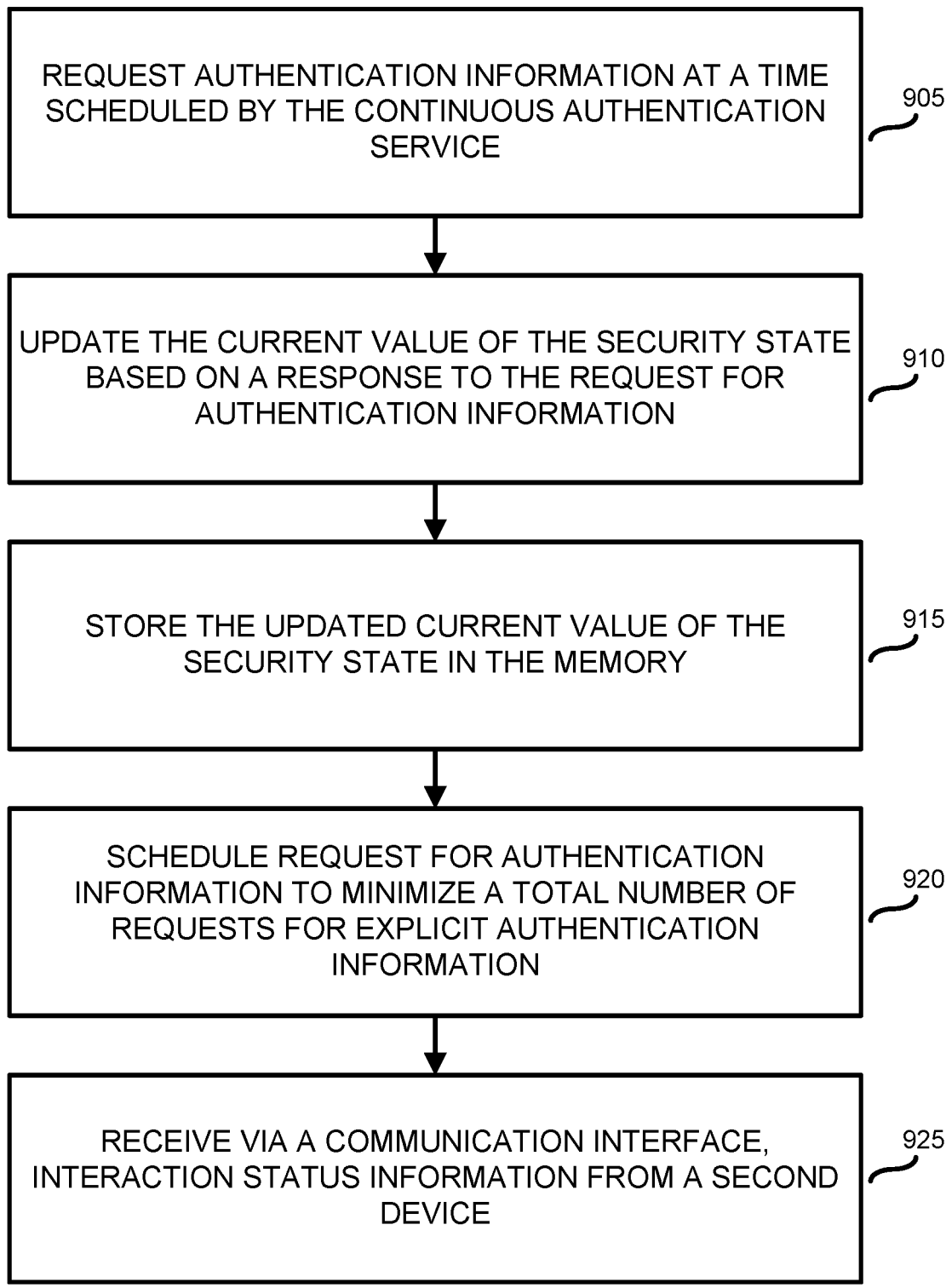
FIGS. 9A and 9B illustrate operations of methods for implementing resource access control authentication according to embodiments of this disclosure.
Figure 9B:
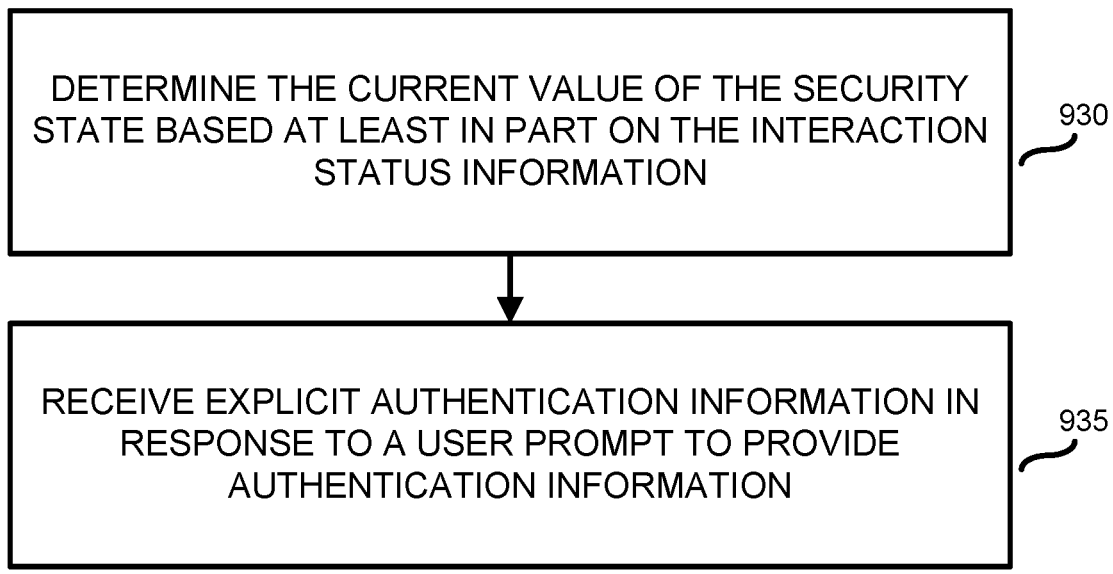

FIGS. 9A and 9B illustrate operations of methods for performing resource access control authentication according to certain embodiments of this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to certain embodiments, the operations described with respect to FIGS. 9A and 9B are performed in addition to, or instead of, operations of other methods for performing resource access control authentication (for example, method 800 in FIG. 8).

Referring to the non-limiting example of FIG. 9A, at operation 905, a continuous authentication service (for example, continuous authentication service 300 in FIG. 3, or continuous authentication service 701 in FIG. 7) requests authentication information (for example, through an active authentication functionality triggered by scheduler 340 in FIG. 3) at a time scheduled by the continuous authentication service. According to certain embodiments, at operation 905, the continuous authentication service requests authentication information at a time and of a type determined by a scheduler of the continuous authentication service.

According to certain embodiments, at operation 910, the continuous authentication service updates the current value of the security state for the device (for example, S in FIG. 5) based, at least in part on the response to request for authentication information performed at operation 905. According to certain embodiments, the authentication information obtained in the request is included in a set of event data (for example, E in FIG. 5) considered by an algorithm for determining the current value of the security state of the device. In some embodiments, the response to the request for authentication information performed at operation 905 results in a failure of the authentication operation (for example, a user's face not being detected in the facial scan). In certain embodiments, such failure results are ignored at operation 910. In some embodiments, such failure results are considered, and included in a set of event data considered by the continuous authentication service.

Referring to the non-limiting example of FIG. 9A, at operation 915, the current value of the security state is stored in a memory of the device (for example, memory 160 in FIG. 1). According to certain embodiments, the current value of the security state is accessible to a context monitor (for example, context monitor 325 in FIG. 3) where it can be used to tune the frequency and mode of an active authentication functionality to suit the current context of the device. In some embodiments, the current value of the security state stored in memory is accessible to an executor (for example, executor 330 in FIG. 3), where it can be used to grant or deny access requests received in between updates to the current value of the security state of the device.

As shown in the illustrative example of FIG. 9A, at operation 920 the continuous authentication service, or a submodule thereof, schedules requests for authentication information (for example, through active authentication functionality 315 in FIG. 3) according to control logic minimizing a total number of requests for explicit authentication information. According to certain embodiments, the control logic for minimizing a total number of requests for explicit authentication information (or other operational parameters of interest) is implemented through setting one or more trigger thresholds for non-explicit authentication operations (for example, $S_{face}$ in FIG. 5). In certain embodiments, the control logic for minimizing the total number of requests for explicit authentication (or other operational parameters of interest) is implemented through conditional decision logic (for example, control logic 600 in FIG. 6).

In certain embodiments, at operation 925, a continuous authentication service receives, via a communication interface (for example, a dedicated channel supported by communication unit 110 in FIG. 1) interaction status information from a second device (for example, second device 703 in FIG. 7.

As shown in the illustrative example of FIG. 9B, at operation 930, a continuous authentication service determines the current value of the security state of the device based at least in part on interaction status information received from a second device at operation 925. According to certain embodiments, the interaction status information comprises one or more values of E, which are provided to an algorithm of the form $S=f(r, t, e, p)$, as described with reference to the illustrative example of FIG. 3 of this disclosure.

In certain embodiments according to this disclosure, at operation 935, a continuous authentication service receives explicit authentication information in response to a user prompt provided by the device implementing the continuous authentication service to provide explicit authentication information. Examples of explicit authentication information received at operation 935 include, without limitation, a PIN, a password, a traced pattern on a screen, the result of a fingerprint scan, or the result of a voice recognition operation.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of providing resource access control, the method comprising:

launching, at a boot time, a continuous authentication service for authenticating a user access of a first device, the first device comprising a processor, a memory configured to store a current value of a security state, and one or more sensors configured to collect authentication information;

receiving the authentication information comprising one or more explicit authentication information and one or more implicit authentication information;

performing, by the continuous authentication service, implicit authorization for the one or more implicit authentication information at a time interval scheduled by the continuous authentication service;

updating the current value of the security state based on a response to performing the implicit authorization for the one or more implicit authentication information to generate an updated current value of the security state;

storing the updated current value of the security state in the memory;

sending, via a communication interface, the updated current value of the security state to a second device;

controlling access to a resource of the second device based on the updated current value of the security state;

receiving a request for access to a resource of the first device;

determining, by the continuous authentication service, the updated current value of the security state, the updated current value of the security state based at least in part on a time interval between a receipt time of the authentication information and a current time;

requesting, by the continuous authentication service, the authentication information at a time scheduled by the continuous authentication service;

updating the updated current value of the security state based on a response to requesting the authentication information to generate a twice-updated current value of the security state;

sending, via the communication interface, the twice-updated current value of the security state to the second device; and controlling access to the resource of the first device and to the resource of the second device based on the twice-updated current value of the security state.

2. The method of claim 1, further comprising:
storing the twice-updated current value of the security state in the memory.

3. The method of claim 1, wherein the response to requesting the authentication information comprises a report of a failure to obtain the one or more implicit authentication information.

4. The method of claim 1, wherein the time of requesting the authentication information is scheduled to minimize a number of requests for the one or more explicit authentication information.

5. The method of claim 1, further comprising:
receiving, via the communication interface, interaction status information from the second device; and
determining the updated current value of the security state based at least in part on the interaction status information.

6. The method of claim 1, wherein the one or more explicit authentication information comprises information received by the first device in response to a user prompt to provide the authentication information at a sensor of the one or more sensors of the first device.

7. The method of claim 6, wherein the one or more explicit authentication information comprises one or more of a personal identification number (PIN), a password, a traced pattern on a screen, a result of a fingerprint scan, or a result of a voice recognition operation.

8. A first electronic device configured to provide resource access control, the first electronic device comprising:
a processor;
one or more sensors configured to collect authentication information; and
a memory configured to store a current value of a security state and comprising instructions that, when executed by the processor, cause the first electronic device to:
launch, at a boot time, a continuous authentication service for authenticating a user access of the first electronic device;
receive the authentication information comprising one or more explicit authentication information and one or more implicit authentication information;
perform, by the continuous authentication service, implicit authorization for the one or more implicit authentication information at a time interval scheduled by the continuous authentication service;
update the current value of the security state based on a response to performing the implicit authorization for the one or more implicit authentication information to generate an updated current value of the security state;
store the updated current value of the security state in the memory;
send, via a communication interface, the updated current value of the security state to a second electronic device;
control access to a resource of the second electronic device based on the updated current value of the security state;
receive a request for access to a resource of the first electronic device;
determine, by the continuous authentication service, the updated current value of the security state, the updated current value of the security state based at least in part on a time interval between a receipt time of the authentication information and a current time;
request, by the continuous authentication service, the authentication information at a time scheduled by the continuous authentication service;
update the updated current value of the security state based on a response to the request for the authentication information to generate a twice-updated current value of the security state;
send, via the communication interface, the twice-updated current value of the security state to the second electronic device; and
control access to the resource of the first electronic device and to the resource of the second electronic device based on the twice-updated current value of the security state.

9. The first electronic device of claim 8, wherein the memory further comprises instructions that, when executed by the processor, cause the first electronic device to store the twice-updated current value of the security state in the memory.

10. The first electronic device of claim 8, wherein the response to the request for the authentication information comprises a report of a failure to obtain the one or more implicit authentication information.

11. The first electronic device of claim 8, wherein the time of the request for the authentication information is scheduled to minimize a number of requests for the one or more explicit authentication information.

12. The first electronic device of claim 8, wherein the memory further contains instructions that, when executed by the processor, cause the first electronic device to:
receive, via the communication interface, interaction status information from the second electronic device; and
determine the updated current value of the security state based at least in part on the interaction status information.

13. The first electronic device of claim 8, wherein the one or more explicit authentication information comprises information received by the first electronic device in response to a user prompt to provide the authentication information at a sensor of the one or more sensors of the first electronic device.

14. The first electronic device of claim 13, wherein the one or more explicit authentication information comprises one or more of a personal identification number (PIN), a password, a traced pattern on a screen, a result of a fingerprint scan, or a result of a voice recognition operation.

15. A non-transitory computer-readable medium comprising instructions that, when executed by a processor, causes a first device to:
launch, at a boot time, a continuous authentication service for authenticating a user access of the first device, the first device comprising the processor, a memory configured to store a current value of a security state, and one or more sensors configured to collect authentication information;
receive the authentication information comprising one or more explicit authentication information and one or more implicit authentication information;
perform, by the continuous authentication service, implicit authorization for the one or more implicit authentication information at a time interval scheduled by the continuous authentication service;
update the current value of the security state based on a response to performing the implicit authorization for the one or more implicit authentication information to generate an updated current value of the security state;

store the updated current value of the security state in the memory;

send, via a communication interface, the updated current value of the security state to a second device;

control access to a resource of the second device based on the updated current value of the security state;

receive a request for access to a resource of the first device;

determine, by the continuous authentication service, the updated current value of the security state, the updated current value of the security state based at least in part on a time interval between a receipt time of the authentication information and a current time;

request, by the continuous authentication service, the authentication information at a time scheduled by the continuous authentication service;

update the updated current value of the security state based on a response to the request for the authentication information to generate a twice-updated current value of the security state;

send, via the communication interface, the twice-updated current value of the security state to the second device; and control access to the resource of the first device and to the resource of the second device based on the twice-updated current value of the security state.

16. The non-transitory computer-readable medium of claim 15, further comprising instructions that, when executed by the processor, cause the first device to store the twice-updated current value of the security state in the memory.

17. The non-transitory computer-readable medium of claim 15, wherein the response to the request for the authentication information comprises a report of a failure to obtain the one or more implicit authentication information.

18. The non-transitory computer-readable medium of claim 15, wherein the time of the request for the authentication information is scheduled to minimize a number of requests for the one or more explicit authentication information.

19. The non-transitory computer-readable medium of claim 15, wherein the one or more explicit authentication information comprises information received by the first device in response to a user prompt to provide the authentication information at a sensor of the one or more sensors of the first device.

20. The non-transitory computer-readable medium of claim 15, wherein the one or more explicit authentication information comprises one or more of a personal identification number (PIN), a password, a traced pattern on a screen, a result of a fingerprint scan, or a result of a voice recognition operation.

* * * * *